US011857384B2

(12) United States Patent
Fayer et al.

(10) Patent No.: US 11,857,384 B2
(45) Date of Patent: Jan. 2, 2024

(54) DENTAL DEVICE WITH LOAD-RESPONSIVE MOTOR CONTROL

(71) Applicant: DENTSPLY SIRONA Inc., York, PA (US)

(72) Inventors: Jay Alexander Fayer, Crystal Lake, IL (US); Ignacio Michel, Carol Stream, IL (US); Joseph R. Reagan, Steelton, PA (US); Kevin Lint, Seven Valleys, PA (US); Jeremy Kile, York, PA (US); Bret Beane, Scottsdale, AZ (US)

(73) Assignee: DENTSPLY SIRONA INC., York, PA (US)

( * ) Notice: Subject to any disclaimer, the term of this patent is extended or adjusted under 35 U.S.C. 154(b) by 498 days.

(21) Appl. No.: 16/907,519

(22) Filed: Jun. 22, 2020

(65) Prior Publication Data

US 2020/0383751 A1 Dec. 10, 2020

Related U.S. Application Data

(63) Continuation of application No. 15/696,562, filed on Sep. 6, 2017, now abandoned.

(60) Provisional application No. 62/414,221, filed on Oct. 28, 2016, provisional application No. 62/384,468, filed on Sep. 7, 2016.

(51) Int. Cl.
*A61C 1/00* (2006.01)
*A61C 1/18* (2006.01)
*H02P 29/00* (2016.01)
*A61C 17/00* (2006.01)

(52) U.S. Cl.
CPC ............ *A61C 1/003* (2013.01); *A61C 1/0038* (2013.01); *A61C 1/186* (2013.01); *H02P 29/0016* (2013.01); *A61C 17/005* (2013.01)

(58) Field of Classification Search
CPC ........ H02P 6/08; H02P 6/0016; Y10S 388/93; Y10S 388/902; A61C 1/0015; A61C 1/0023; A61C 1/186; A61C 1/003; A61C 1/06; A61C 17/005; A61C 17/26; A61C 17/24
See application file for complete search history.

(56) References Cited

U.S. PATENT DOCUMENTS

| | | | | |
|---|---|---|---|---|
| 5,493,747 | A * | 2/1996 | Inakagata | .......... A46B 15/0012 |
| | | | | 15/22.1 |
| 6,616,446 | B1 * | 9/2003 | Schmid | .............. B23Q 17/0957 |
| | | | | 433/224 |
| 10,285,776 | B1 * | 5/2019 | Feldman | .................. A61C 1/06 |

(Continued)

*Primary Examiner* — Jacqueline T Johanas
*Assistant Examiner* — Shannel Nicole Belk
(74) *Attorney, Agent, or Firm* — DENTSPLY SIRONA INC.

(57) ABSTRACT

A motor-driven dental device has a motor control that is responsive to a load placed upon the motor. More specifically, the invention relates to a dental device having motor that drives a tool, wherein the tool is activated or otherwise controlled in response to a load placed upon the motor through the tool, such as by touching the tool to a surface. The tool may also be controlled by the sustenance, over a predetermined time period, of an increase or decrease in motor current beyond a predetermined hysteresis current threshold. The motor may be an electric motor, a rotary electric motor, and air driven motor, an ultrasonic device or the like.

16 Claims, 17 Drawing Sheets

(56) References Cited

U.S. PATENT DOCUMENTS

| | | | |
|---|---|---|---|
| 2011/0275327 A1* | 11/2011 | Lint | A61C 1/0023 |
| | | | 455/66.1 |
| 2013/0099710 A1* | 4/2013 | Okamoto | A61C 1/06 |
| | | | 318/434 |
| 2017/0319311 A1* | 11/2017 | Luettgen | A46B 15/0012 |
| 2018/0307797 A1* | 10/2018 | St. Louis | A61C 1/0015 |

* cited by examiner

SECTION A-A

DENTAL DEVICE WITH LOAD-RESPONSIVE MOTOR CONTROL

FIELD OF THE INVENTION

The present invention generally relates to a dental device that is motor driven. More particularly, the invention relates to a motor-driven dental device having a motor control that is responsive to a load placed upon the motor. Even more particularly, the invention relates to a dental device having motor that drives a tool, wherein the tool is activated or otherwise controlled in response to a load placed upon the motor through the tool, such as by touching the tool to a surface.

BACKGROUND OF THE INVENTION

It is known in the dental art to provide motor driven tools, such as for example, drills, burs, files, excavating bits, polishing discs, prophylactic devices, ultrasonically-driven tools (such as those driven by magnetostrictive or piezo devices), and the like. It is also known in the art to provide such devices in the form of a handpiece that the dental professional can grasp and use to manipulate the tool. Cordless handpieces exist in the conventional art as shown, for example, in U.S. Pat. No. 8,777,616B2 which is hereby incorporated by reference for background purposes.

It is beneficial to provide such devices with various motor controls such as on/off switches, speed controls, torque controls, direction controls or the like. When the dental professional is manipulating such devices and their associated controls, it often proves difficult to manipulate other tools or devices needed for a given dental procedure. It would be advantageous therefore, to provide a motor driven dental tool device with a motor control that provides a more advantageous control of the motor for the dental professional.

For example, in the case of a prophylaxis (prophy) handpiece (such as the RDH Freedom brand prophy handpiece from DENTSPLY International of York, PA) that drives disposable prophy-angles (DPAs), it is desirable during a prophy treatment that rotary speed be adjusted by the practitioner according to need. This is commonly done through a foot pedal (rheostat) that controls air flow to the air-powered handpiece. The practitioner then must adjust the foot pedal to find the speed that corresponds to the work needed. An ordinary air motor, whose speed is only approximately regulated, gives the practitioner audible feedback of the load they apply when the speed drops a little in proportion to the load. However, no such feedback is available in motors with very well regulated speed, such as is found in a typical electric dental handpiece.

With conventional rotary motor speed controls, in order to maintain a (nearly) constant speed under varying load, the load is monitored and used to compensate the energy delivered to the motor. Such speed-regulating behavior is intrinsic to a permanent-magnet electric motor, or even a pneumatic (air) motor, the speed of which is approximately proportional to (regulated) pressure. It is known to apply electronic control for more accurate speed regulation. Prior devices do not change the speed based on the load seen. It only tries to maintain the speed commanded by the foot pedal, whether pneumatic, electric, with or without additional speed-control.

BRIEF SUMMARY OF THE INVENTION

According to the present invention, a handpiece such as a prophy handpiece is driven by an electric motor, and the varying load (torque) applied to it is monitored. This load is then translated to an appropriate speed goal, which can be made to increase automatically in response to the need, without a foot pedal or the like. The speed can increase with load in steps, or in a continuous and proportional way, or both, tailored to the need as clinically appropriate. There is a transition from load to speed, with a speed that increases in some relation with load. In addition, the invention relates to a dental handpiece, for example, a dental prophylaxis handpiece having a motor control for driving a tool such as a disposable prophy angle (DPA), wherein the handpiece motor is activated or otherwise controlled in response to a torsional load placed upon the motor through the DPA action, and the sustenance, over a predetermined time period, of a change in motor current above a predetermined hysteresis current threshold. The provided device and system is established on an integrated and operably linked components in an arrangement including a motor, microprocessor, current sense circuitry and power supply disposed within an inner module of a preferably cordless dental prophylaxis handpiece. As stated earlier, the present invention also relates to a handpiece with a motor control for driving a motor of the dental handpiece according to a time delay and a hysteresis current threshold. According to the present invention, a handpiece such as a prophy handpiece has a Disposable Prophy Angle (DPA) which is driven by an electric motor. A varying torsional load generated by the DPA is transmitted through a drive dog to the gear box of a motor in an inner module of the handpiece. The motor starts slowing down as a result. A Proportional-Integral-Derivative speed (PID) control loop maintains motor speed, by increasing the current to the motor windings. This increase in motor current is established by a motor control method, through the use of preset time delay and hysteresis threshold values to provide a desired user experience. If the change in motor current is significant (i.e. greater than the preset hysteresis threshold) a new speed is selected based on the new motor current operating point. The DPA generates a torsional load, for example, when interacting with a tooth surface or while being plunged into a cup of prophy paste. The torsional load generated by the DPA may emanate from thrust friction and cup deflection caused by the morphology of the tooth and the clinical application force. The DPA cup, being an elastomeric element, conforms to the surface it is polishing. This cup deformation and tooth cup frictional interaction combine to generate a torsional load on the motor which causes the motor to start slowing down. A PID loop may increase current to the motor to maintain the motor speed. A maximum preset speed beyond which the motor speed cannot go may be implemented in the handpiece system. When this speed is reached, mitigation measures such as gradually reducing the speed to zero, or to an idle speed or maintaining the maximum speed may be automatically triggered.

There has thus been outlined, rather broadly, some of the features of the invention in order that the detailed description thereof may be better understood, and in order that the present contribution to the art may be better appreciated. There are additional features of the invention that will be described hereinafter.

In this respect, before explaining at least one embodiment of the invention in detail, it is to be understood that the invention is not limited in its application to the details of construction or to the arrangements of the components set forth in the following description or illustrated in the drawings. The invention is capable of other embodiments and of being practiced and carried out in various ways. Also, it is to be understood that the phraseology and terminology employed herein are for the purpose of the description and should not be regarded as limiting.

An object is to provide a handpiece system wherein a foot pedal is not necessary, resulting in a handpiece simpler and easier to use, and less expensive than conventional devices. The need for a foot pedal has been eliminated by combining speed adjustment with what the practitioner already does in cleaning (in the case of a prophy handpiece). And in this, the handpiece is made more responsive to the user.

Another object is to provide a handpiece system again in relation to a prophy handpiece, wherein spatter or the inadvertent spraying of a mixture of prophy paste, saliva and detritus, caused by removing the prophy cup from the oral cavity while still spinning too fast, can be reduced or eliminated. This is done by automatically and promptly reducing speed when a load is no longer applied, an action formerly requiring careful coordination by the practitioner of both hand and foot.

Another object is to provide a handpiece system wherein the motor speed is intentionally dropped or reduced at least somewhat load, similar to a powerful air motor, rather than regulating it to a constant value. This is a matter of tailoring the speed response to load, and can be applied wherever a strictly-constant speed might otherwise be appropriate.

Yet another object is to provide a handpiece system wherein the system can be applied to any medical or dental instrument, whether electrically or pneumatically powered, or rotary (low-speed or high-speed), reciprocating (rotary or longitudinal) or oscillating (sonic or ultrasonic), or the like. It can also be applied to powered tools of many kinds, such as a cordless drill, screwdriver, toothbrush or saw.

Another object is to provide a handpiece with an outer sheath and an inner module wherein the outer sheath and inner module have a plurality of seals to prevent the ingress of fluids into the handpiece system.

An object is to provide a dental prophy handpiece with a motor control wherein the DPA application speed can be operably controlled by varying torsional load exerted on the motor to provide a seamless treatment for a patient and an easy use for the dental practitioner. The motor control may replace the use of foot pedals to control the DPA. It may also be used in conjunction with foot pedals to control the DPA by overriding the motor control through wireless radio communication such as through a secured RF protocol with a cordless foot pedal Another object is to provide a handpiece system with a motor control wherein the motor control can be applied to any medical or dental instrument, whether electrically or pneumatically powered, or rotary (low-speed or high-speed), reciprocating (rotary or longitudinal) or oscillating (sonic or ultrasonic), or the like. It can also be applied to powered tools of many kinds, such as a cordless drill, screwdriver, toothbrush or saw.

Another object is to provide a handpiece system wherein the motor speed may be manageably controlled by any combination of a plurality of time delay values and hysteresis current threshold values wherein the plurality of time delay values and hysteresis current thresholds may be fixed or variable.

Other objects and advantages of the present invention will become obvious to the reader and it is intended that these objects and advantages are within the scope of the present invention. To the accomplishment of the above and related objects, this invention may be embodied in the form illustrated in the accompanying drawings, attention being called to the fact, however, that the drawings are illustrative only, and that changes may be made in the specific construction illustrated and described within the scope of this application.

BRIEF DESCRIPTION OF THE DRAWINGS

Various other objects, features and attendant advantages of the present invention will become fully appreciated as the same becomes better understood when considered in conjunction with the accompanying drawings, in which like reference characters designate the same or similar parts throughout the several views, and wherein.

DETAILED DESCRIPTION OF THE INVENTION

Figure 1:
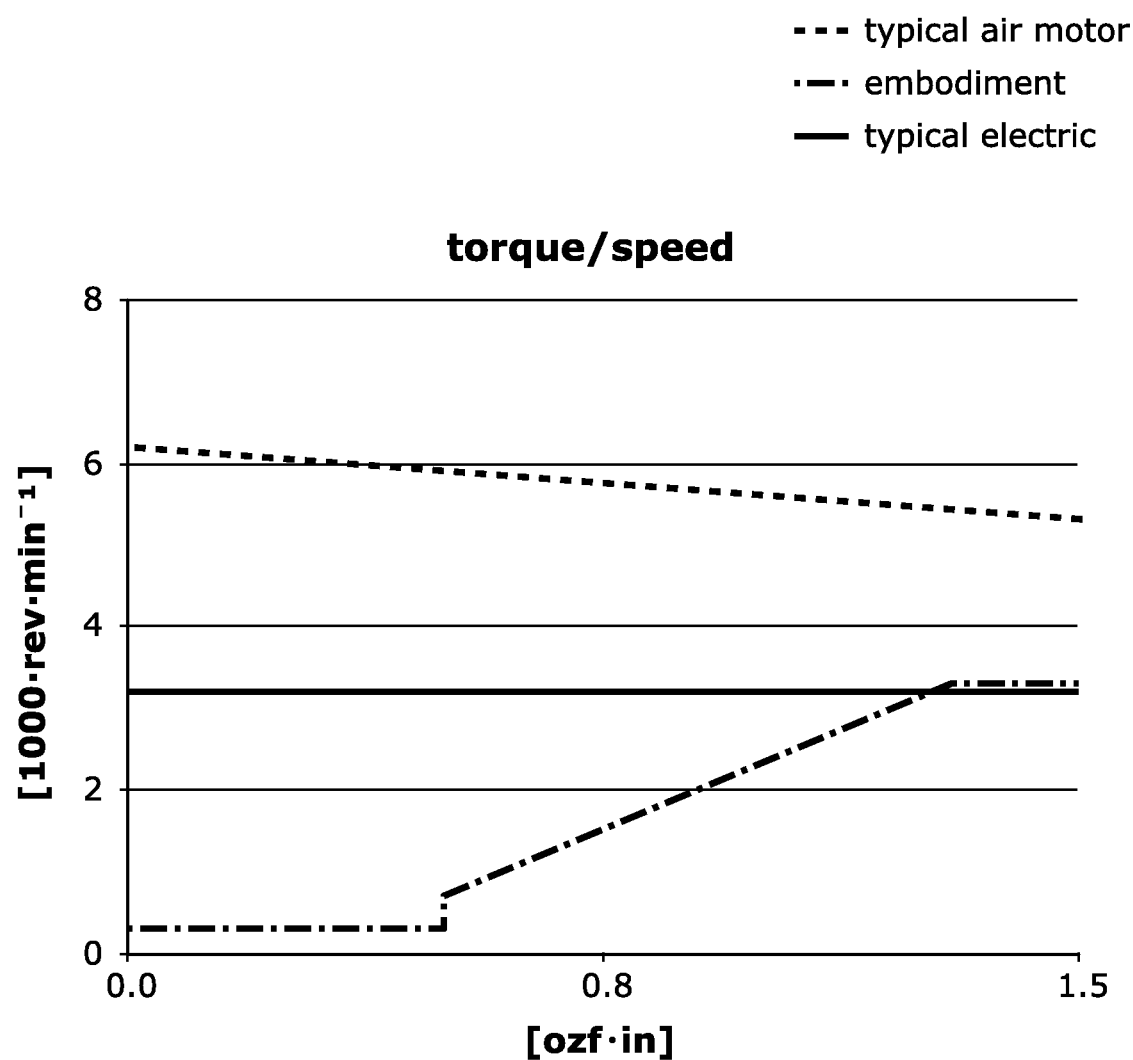
FIG. 1 shows a chart illustrating the speed-vs-load (torque) relationship for a load applied to the motor of the handpiece.

Turning descriptively to the drawings, in which similar reference characters denote similar elements throughout the several views, the figures illustrate dental device having motor that drives a tool, wherein the tool is activated or otherwise controlled in response to a load placed upon the motor through the tool, such as by touching the tool to a surface.

A motor-driven dental handpiece such as a rotary prophy handpiece delivers power as speed×torque. Ordinarily in the conventional art, the motor speed is regulated, even if only approximately—the speed is either maintained under load or it drops. The practitioner then can demand more or less power by applying more or less force between the rotary instrument and the tooth (or dental appliance, etc.) This force, by the nature of the rotary instrument, in turn applies more or less load (torque) to the motor.

According to the present invention, instead of regulating the speed to a constant value under varying load, the speed is increased in response to increasing load. The increase can be in as few as two steps, on/off, or many steps, or in some constant or variable proportion to the load, or any combination of these, as appropriate to the application.

For example, a prophy handpiece could idle at a very low speed, 300 rpm exemplified in the chart of FIG. 1, well below what would cause spatter. It could remain at this speed until the applied load increases, above what is seen when loading prophy paste, to the still higher values encountered in DPA prophy procedures. At that point, the speed could jump from idle speed to cleaning speed, even a speed that increases with increasing load. The instant the load is removed, the speed could drop back to the low idle speed.

In another embodiment of the invention, an ultrasonically driven tool such as used with a Cavitron brand ultrasonic scaler (available from DENTSPLY International of York, PA) that controls for stroke could idle at a very small stroke, barely perceptible to the user but enough to return sufficient feedback to the controller to determine if a load were applied, if the tip touched a tooth or other work surface. At that moment, the commanded stroke would be increased to the working value and remain until the load were removed and scaling were at an end.

A benefit of this approach according to the present invention is that as the motor output (speed, stroke, angle, frequency, etc.) will increase as needed, the idle speed can be very low. It will be appreciated that the present invention provides a motor-control profile that increases the controlled output (speed, stroke, angle, etc.) with load (torque, etc.).

It will be appreciated therefore, that the present invention may be embodied, then, in an electrically-operated handpiece, even an ultrasonic scaler, even when the only control available is on-off. It can also be embodied in an air motor, such as a high-speed dental handpiece, when motor speed can be monitored and the air driving the motor controlled.

A powered instrument, such as a dental handpiece, that incorporates this innovation can be made simpler and less expensive, more responsive, safer, more reliable, and to last longer on a battery-charge. No extra devices, such as a foot pedal, push button, or pressure or force sensor, is needed to adjust the output (speed, angle, stroke, etc.) to suit the clinical need of the moment. This simplifies equipment requirements and reduces cost. By eliminating the delay in the practitioner continually adjusting energy delivered, the instrument is made more responsive to the practitioner, with clinical effect that more accurately reflects the clinical requirement, and in less time.

Particularly for a rotary prophy handpiece, the spatter of prophy paste is a nuisance but also a serious source of cross-contamination. But, the more quickly the motor is stopped after it is done working, the less spatter of prophy paste occurs. In making this automatic in the present invention, such a handpiece minimizes spatter.

Idling only at a low output and increasing output only to what is required in response to demand, such an instrument can be made more reliable, subjected as it is to less wear-and-tear; safer, by generating less heat; and, longer lasting, by minimizing battery-drain, etc.

It will be appreciated that the present invention can be applied to any medical or dental instrument, whether electrically or pneumatically powered, or rotary (low-speed or high-speed), reciprocating (rotary or longitudinal) or oscillating (sonic or ultrasonic), or the like. It can also be applied to powered tools of many kinds, such as a cordless drill, screwdriver, or saw.

Turning to the figures, FIG. 1, is a chart showing speed-vs-load (torque) for a load applied to the motor; a corresponding speed can be found, a speed at which the motor will run steady-state. The present invention as represented on the chart, is an example of a speed response to load for an embodiment in an electric prophy handpiece. At loads below 0.5 ozf·in, the motor response is a speed of about 300 rpm. As load increases, speed also increases.

Figure 2:
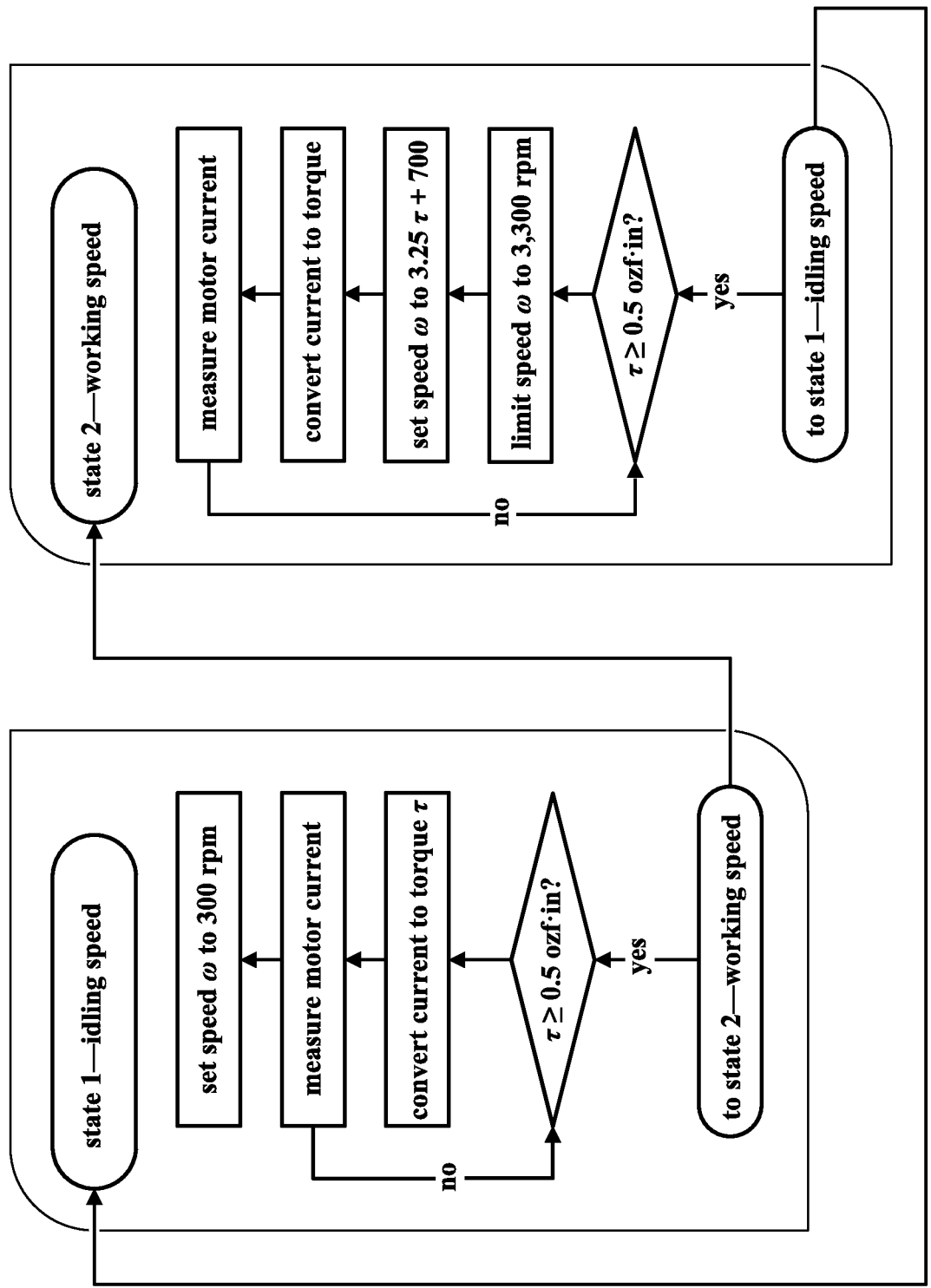
FIG. 2 shows a flow-chart exemplifying an embodiment of the operation of the present invention.

FIG. 2 is a flow-chart exemplifying an embodiment of the operation of the present invention.

Figure 3:
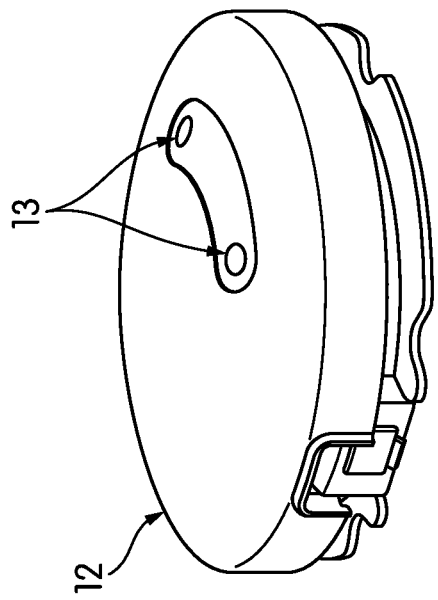
FIG. 3 illustrates the general structure of a prophy handpiece according to the invention. A pedal which is not necessary for the operation of the handpiece is also shown.
Figure 3:
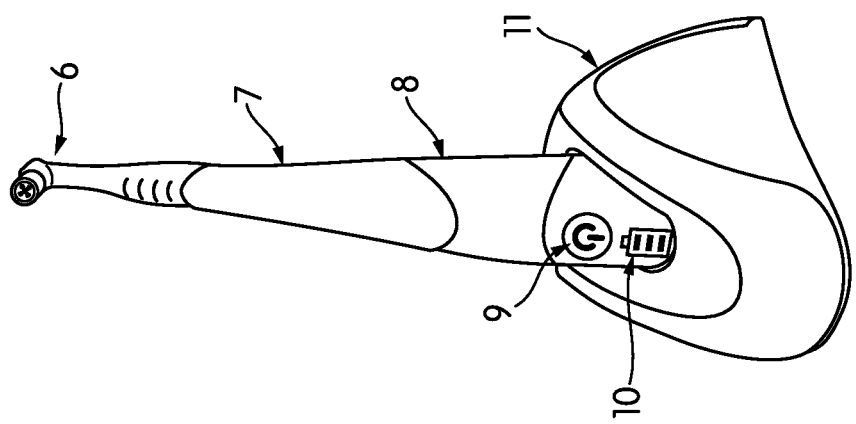

FIG. 3 shows the general structure of a prophy handpiece according to the invention comprising an Inner Module 10, Outer Sheath 8, disposable prophy angle 6, cordless Foot Pedal 12 with LEDs 13, Charging Base 11, grip 7, and a power supply (not shown). The inner module is partially covered by the outer sheath 8. The inner module detachably engages with the disposable prophy angle 6 and the grip 7 allows the user to hold onto the handpiece. A foot pedal 12 is not needed but may be used preferably when the inventive motor control feature is disabled. A pushbutton 9 allows for activating the inner module.

Figure 4:
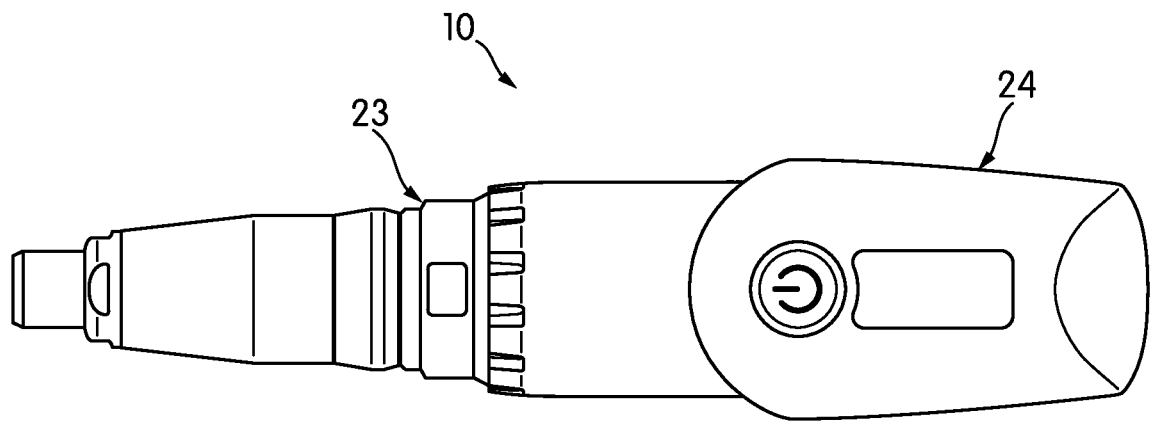
FIG. 4 is a side view illustrating the inner module comprising a front end and a back end.
Figure 5:
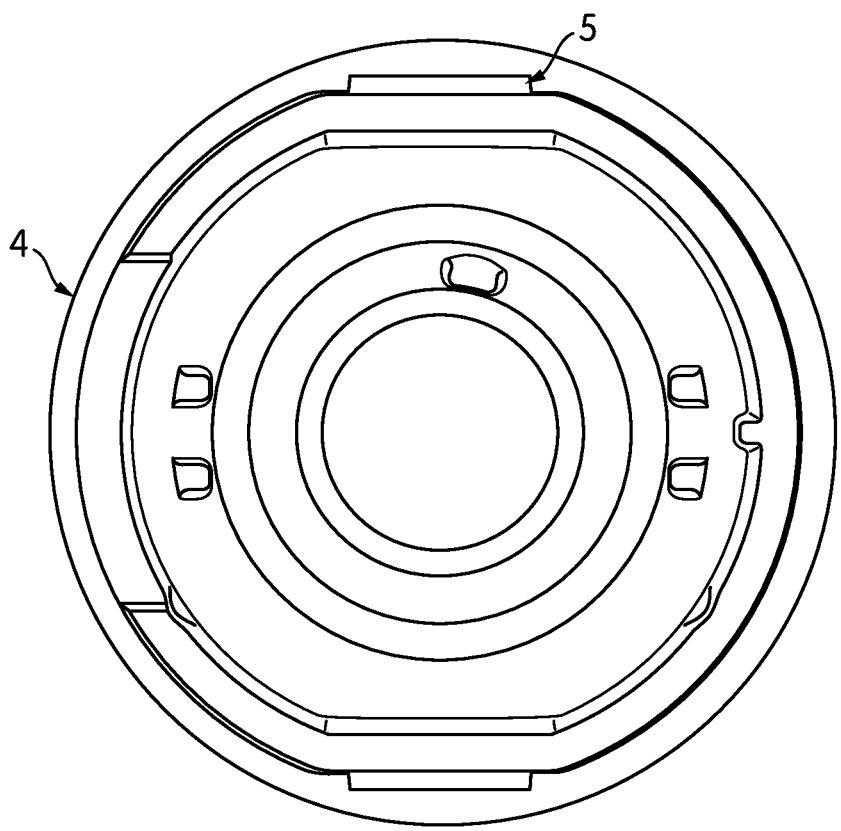
FIG. 5 shows a cross section of the housing of the front end of the inner module without the electrical components.
Figure 6:
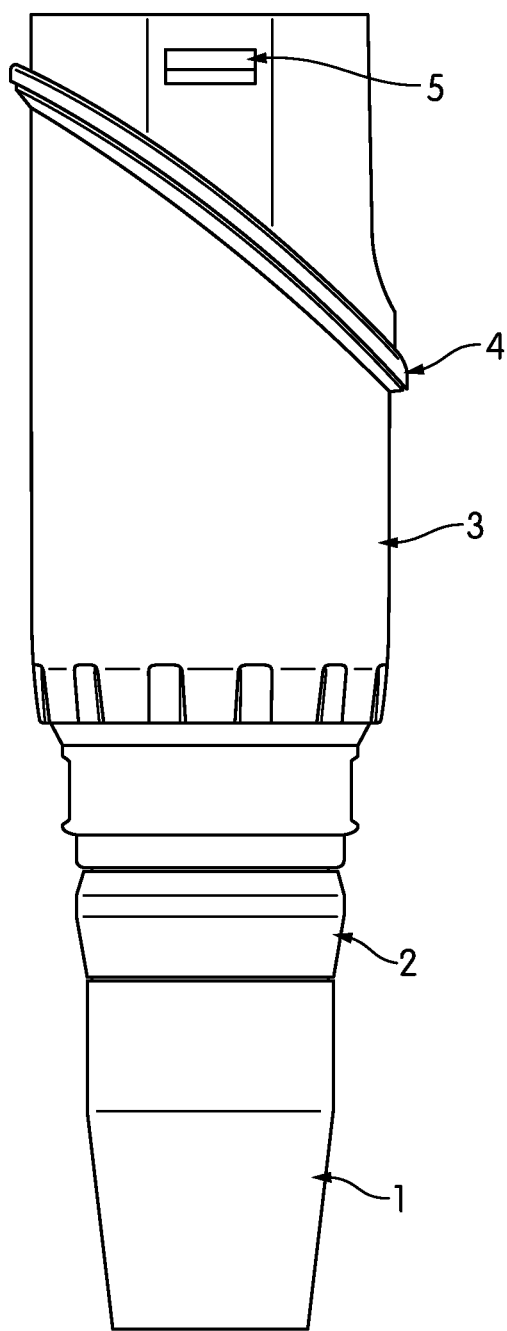
FIG. 6 shows a side view of the housing of the front end of the inner module in a vertical position.
Figure 7:
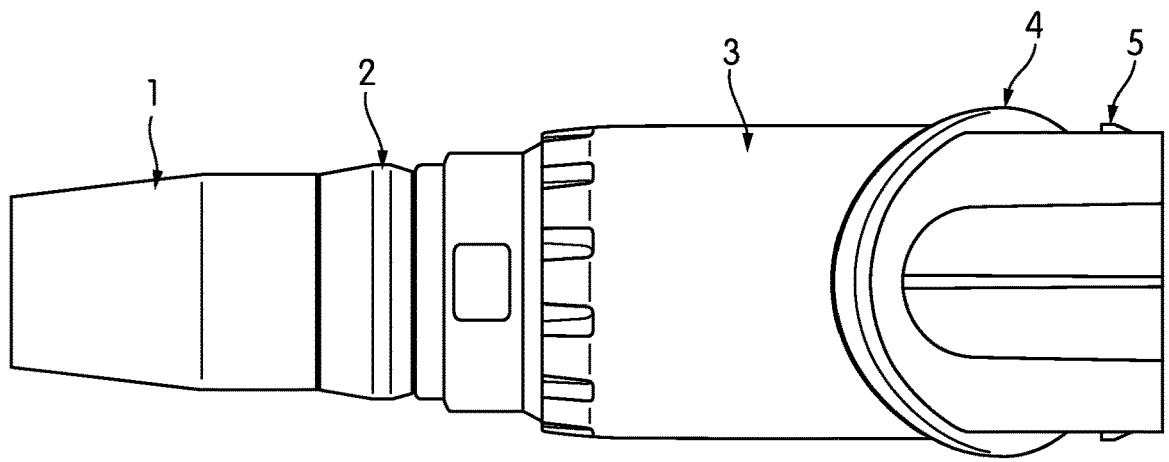
FIG. 7 shows a side view of the housing of the front end of the inner module in a horizontal position.
Figure 8:
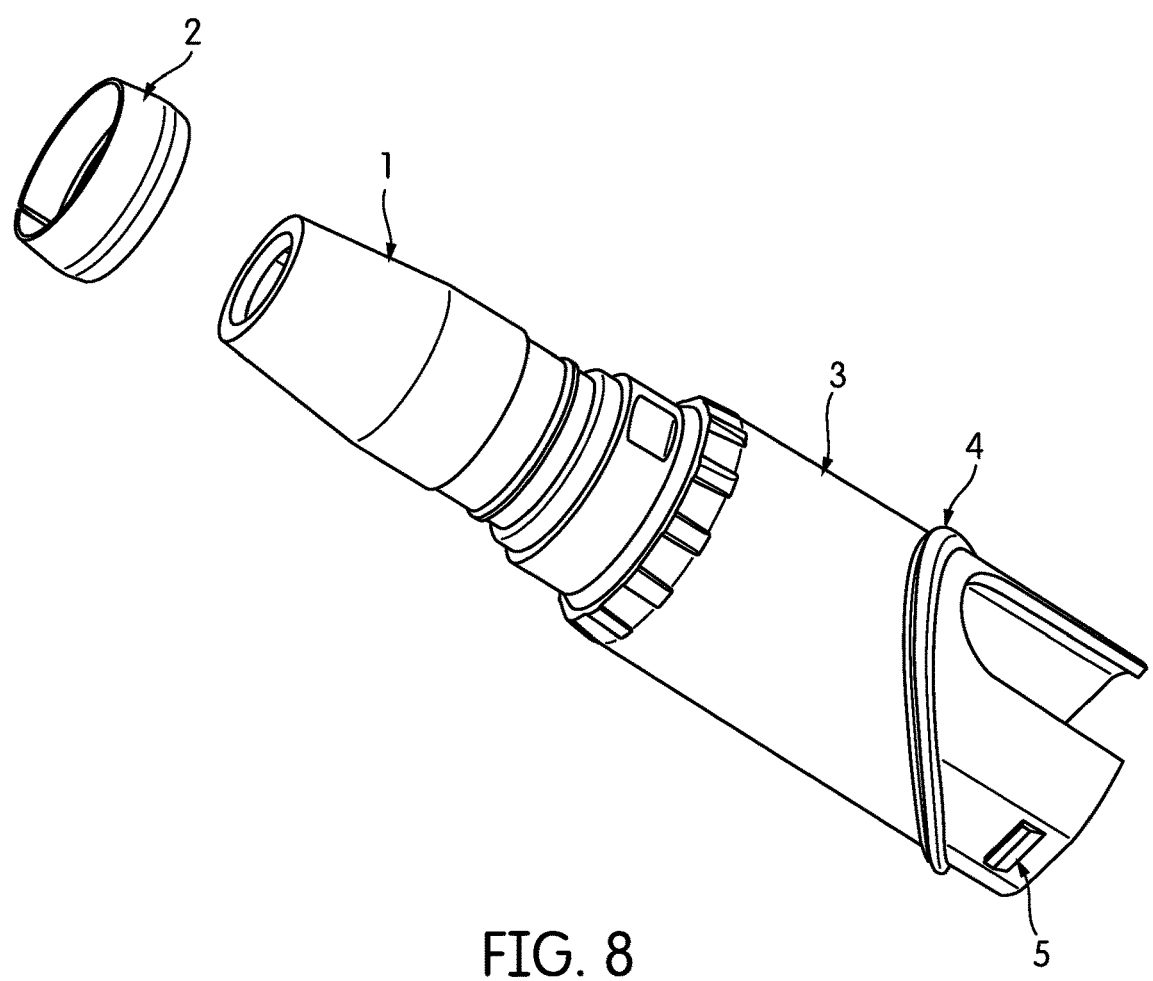
FIG. 8 shows an exploded perspective view of the housing of the front end of the inner module.
Figure 9:
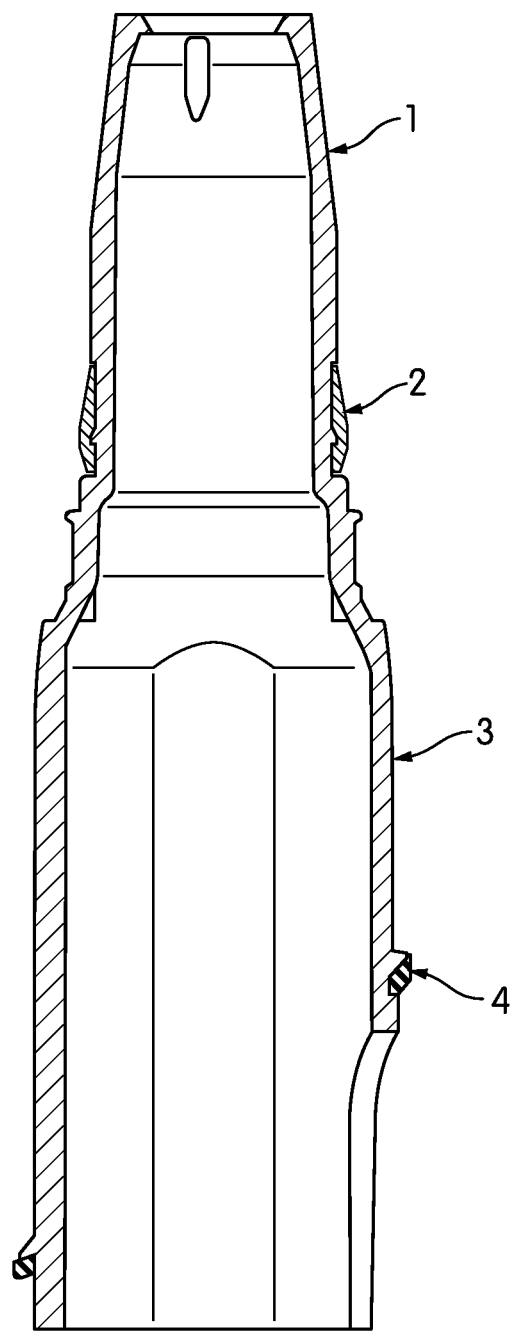
FIG. 9 shows a cross section of the housing of the front end of the inner module.
Figure 10:
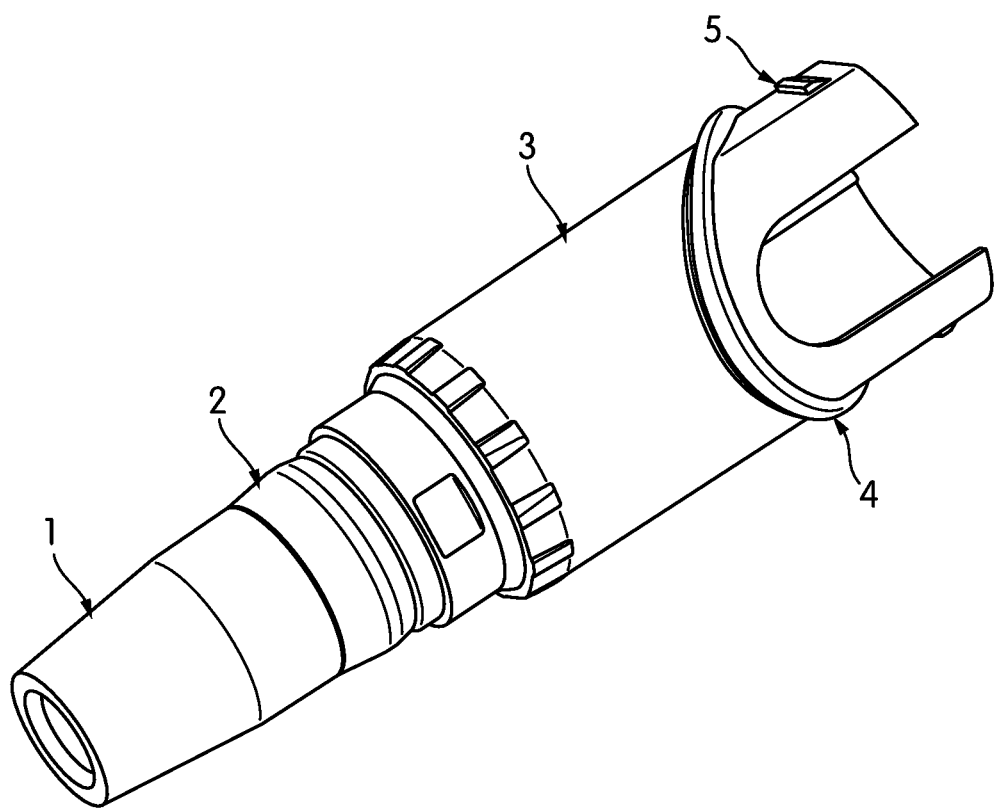
FIG. 10 illustrates an alternative perspective view of the housing of the front end of the inner module.

FIG. 4 is a side view illustrating the inner module 10 which comprises a front end 23, and a back end 24.

Figure 11:
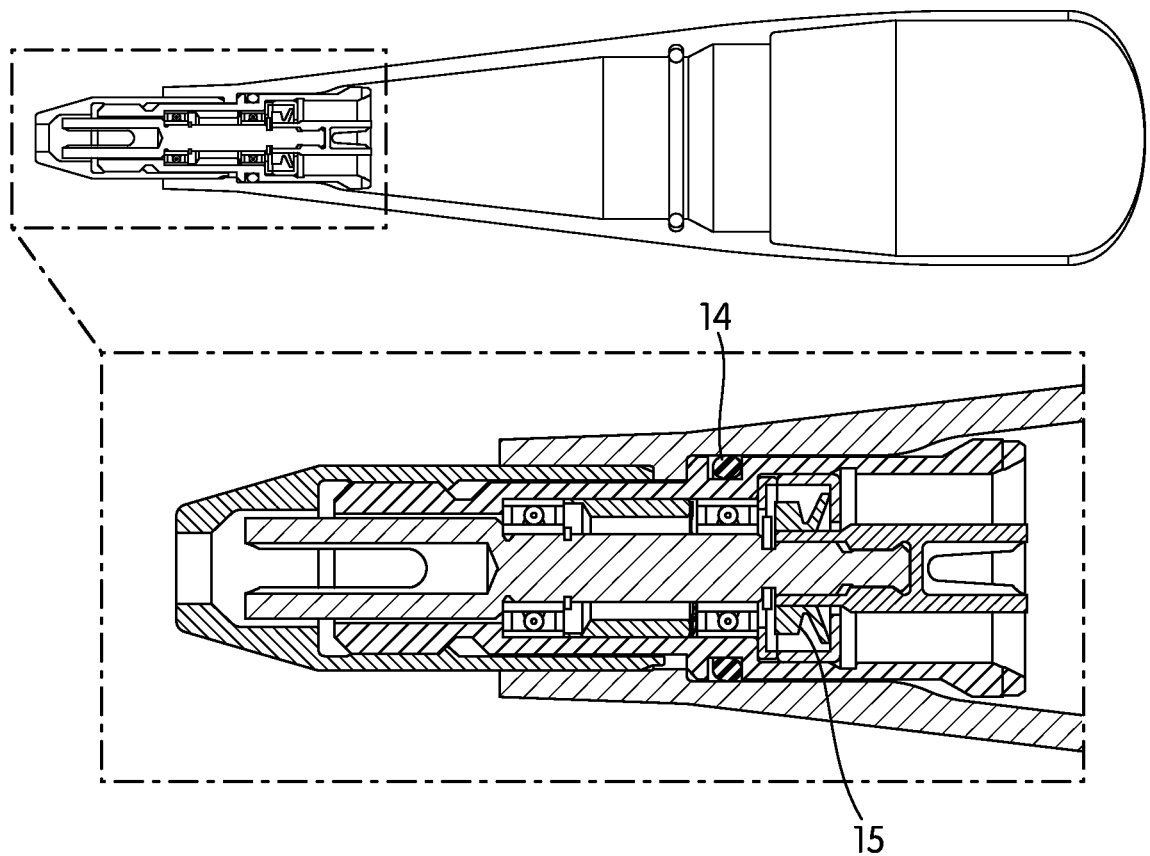
FIG. 11 is a cross sectional view of the outer sheath of the present invention showing the internal seals.
Figure 12:
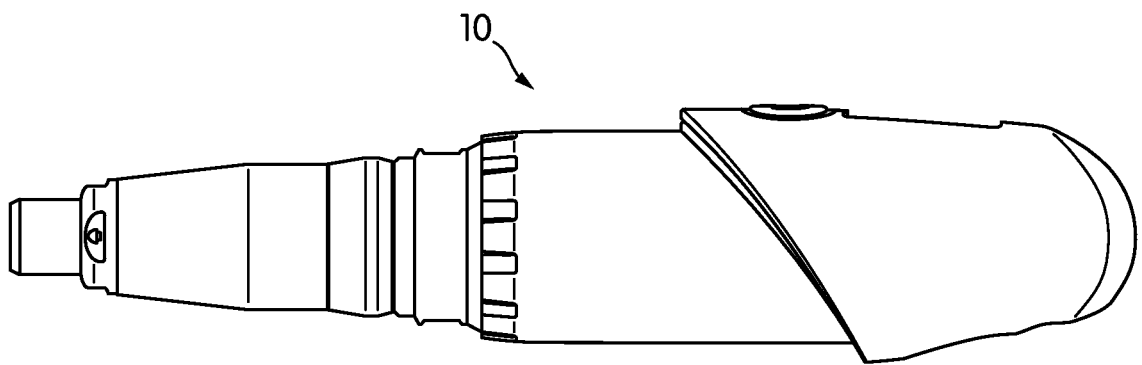
FIG. 12 illustrates an alternative side view of the inner module.
Figure 13:
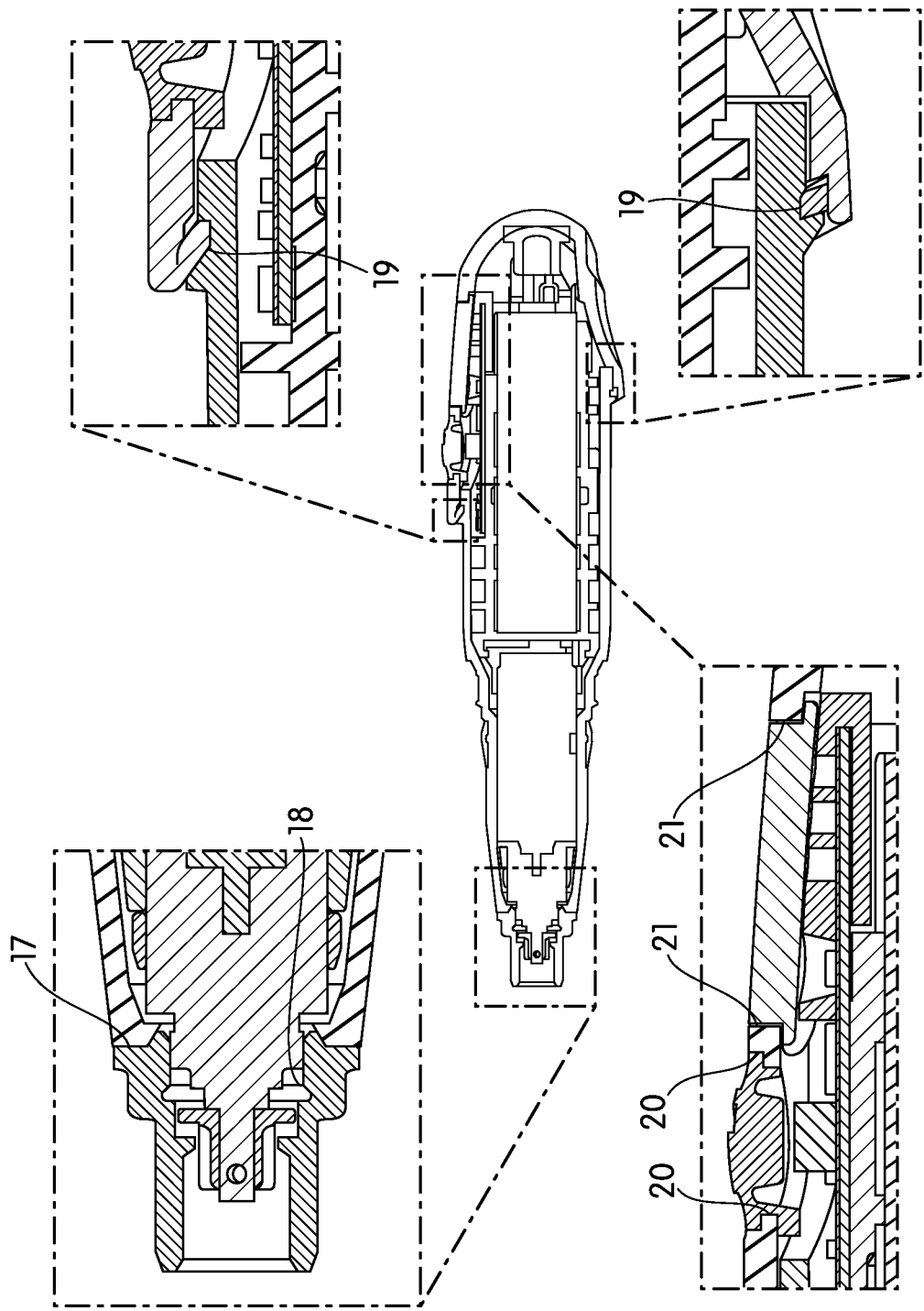
FIG. 13 is a cross sectional view of the inner module showing the inner module seals.
Figure 14:
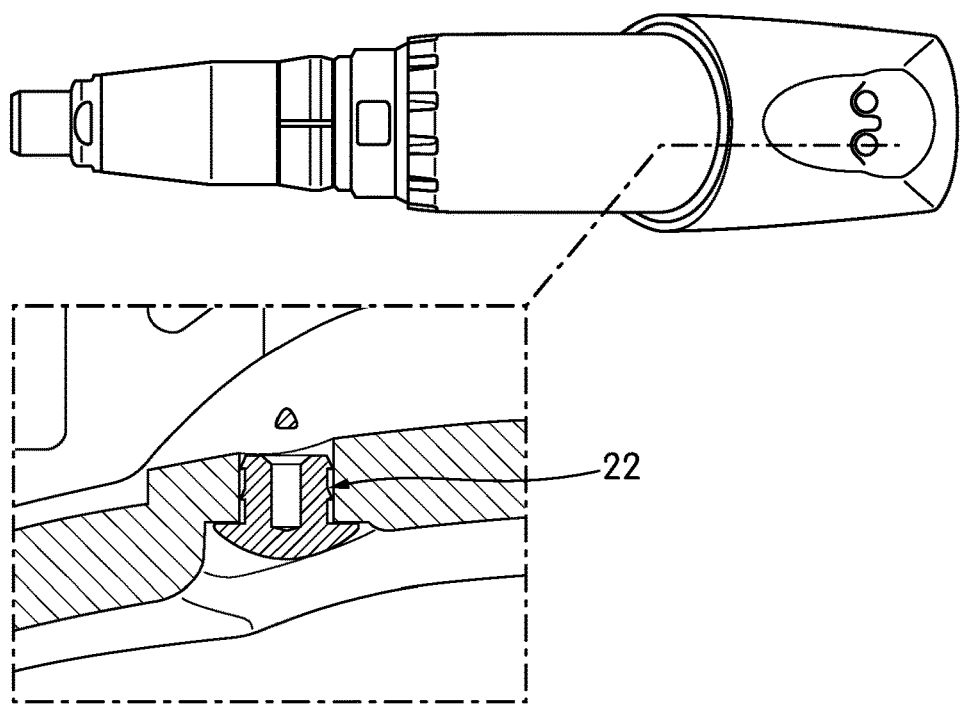
FIG. 14 illustrates an alternative side view of the inner module showing a charging contact seal.
Figure 15:
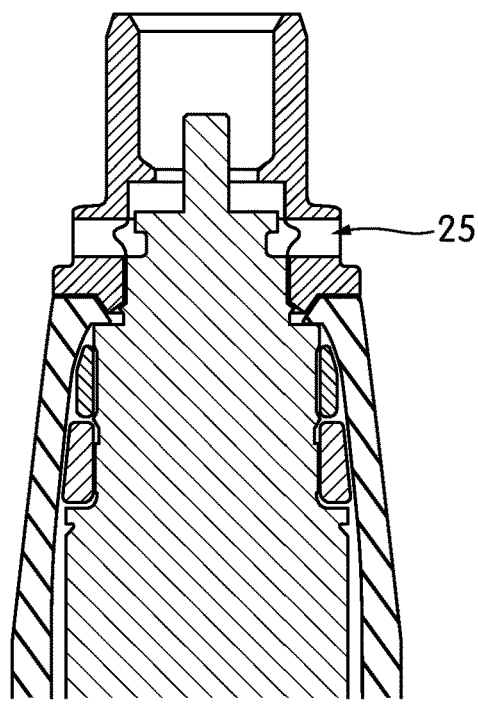
FIG. 15 illustrates a cross section of an alternate embodiment of the inner module housing in which a hole is added to allow for drainage.
Figure 16:
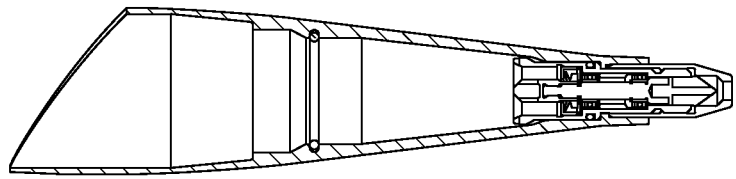
FIG. 16A illustrates a perspective view depicting a detailed design of the components of the outer sheath assembly.
FIG. 16B illustrates another perspective view depicting a detailed design of the components of the outer sheath assembly.
FIG. 16C illustrates a cross-sectional view depicting a detailed design of the components of the outer sheath assembly.
Figure 16:
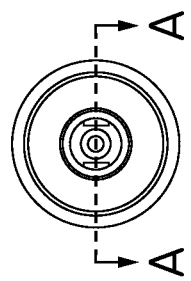
Figure 16:
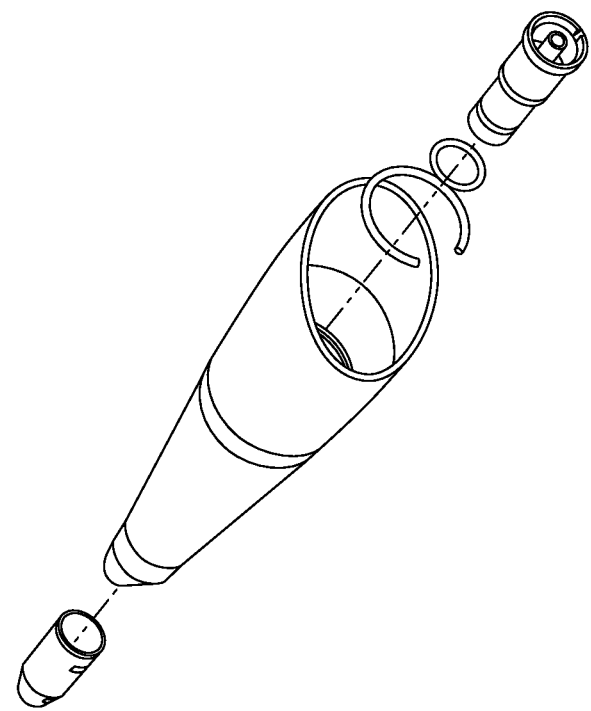
Figure 16:
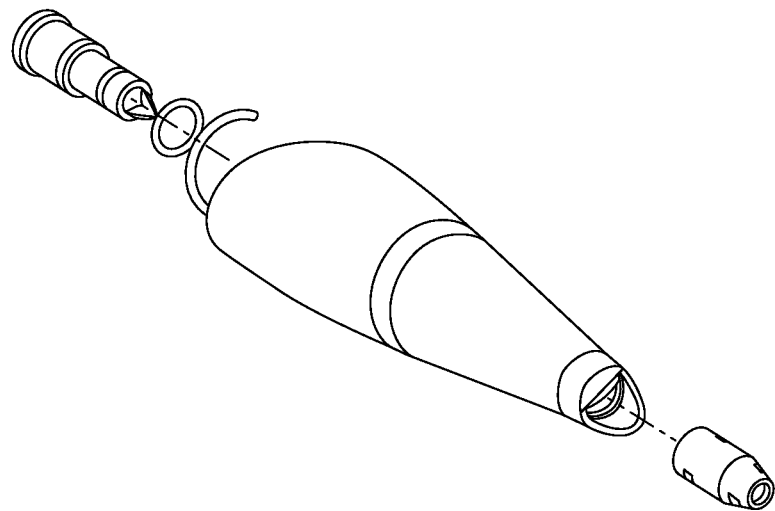

FIGS. 5-10 show different views of the housing of the front end 23 of the inner module 10. The nose 1 receives a disposable prophy angle 6. A snap ring 2 allows the outer sheath to snap tightly onto the inner module. The proximal end 3 houses an overmolded seal 4 which prevents ingress of fluid into the inner module. A latch 5 allows for connection to the back end 24 of the inner module. The outer sheath 8 and inner module 10 have a plurality of seals to prevent the ingress of fluids. The outer sheath seals are illustrated in FIG. 11 which shows an outer sheath 8 with a proximal end and a distal end wherein the distal end has a drive which includes a standard o-ring seal 14 to allow for simultaneous sealing and rotation between the drive and the housing of the sheath. A low drag seal 15 allows for the internal components of the drive to spin without any fluid ingress. FIG. 13 illustrates the seals of the inner module 10. A tight seal 17 is formed between an end cap and the plastic body of the front end 23 of the inner module. Another tight seal 18 is formed between the end cap and motor of the inner module. Seal 19 (showing cross sectional views of seal 4) is formed between the front end 23 and back end 24 of the inner module. In addition, an overmolded button seals, preferably in a cohesive manner, a hole in the back end 20 of the inner module while a window 21 seals a hole in the back end of the inner module. In an alternate embodiment of the inner sheath housing, FIG. 15, a hole 25 running through the housing allows for drainage of fluids that enter from the nose 1 of the inner module when detached from the outer sheath, for example, during spraying of the inner module. FIG. 14 shows a side view of the inner module illustrating a charging contact 22 sealing a hole in the back end 24 of the inner module. Elastomers (not shown) may also be used in the inner module to create compression seals that keep fluids outside the module. Those skilled in the art will recognize that many variations of seals to prevent the ingress of fluids are possible within the spirit and scope of the invention. FIG. 16A-FIG. 16B illustrate perspective views of a detailed design of the components of the outer sheath assembly 26 while FIG. 16. C illustrates a cross-section A-A of the detailed design of the components of the outer sheath assembly 26.

Figure 19:
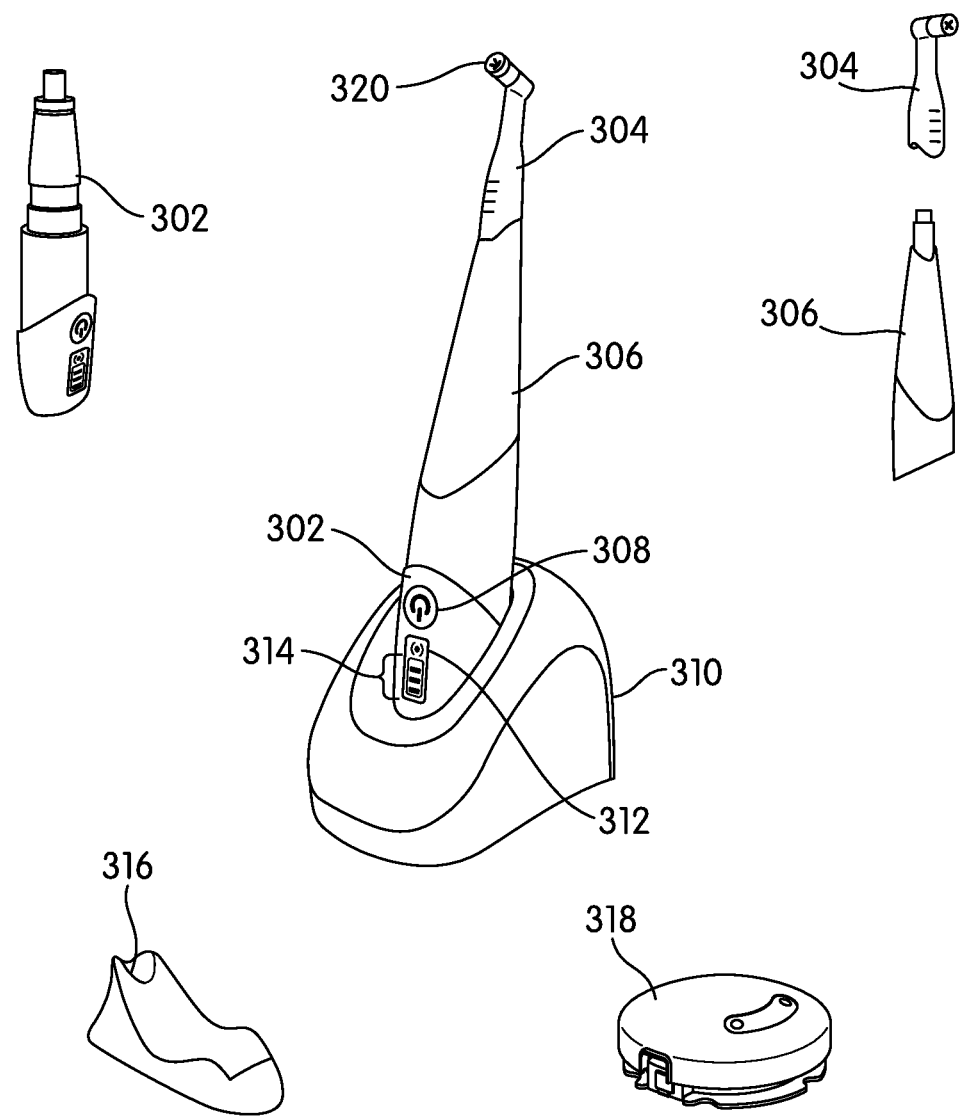
FIG. 19 is a perspective view of a prophy handpiece employing the motor control technology of the present invention.
Figure 20:
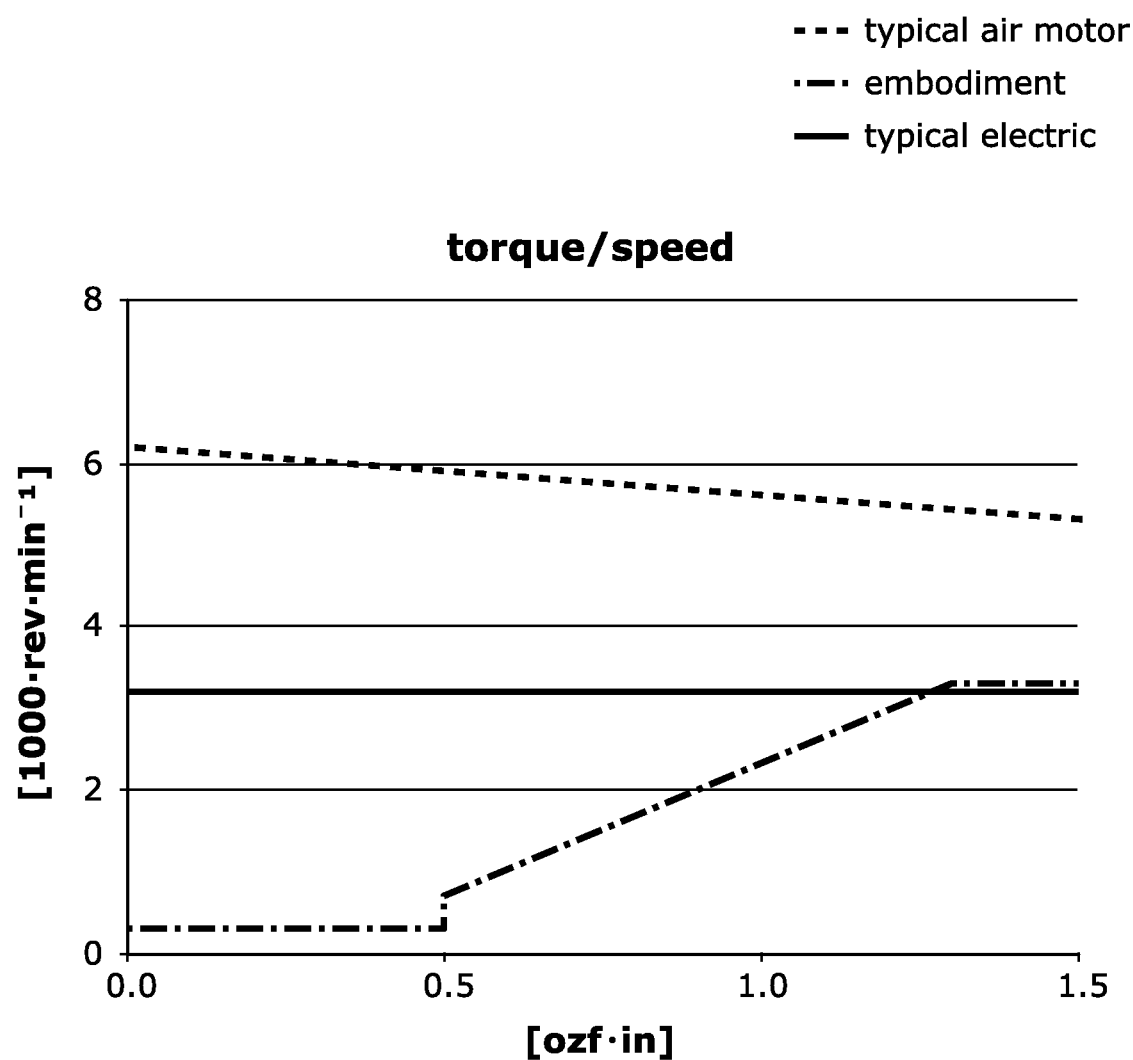
FIG. 20 shows a chart illustrating the speed-vs-torque relationship for a torsional load applied to the motor of the handpiece.

Another handpiece embodying the invention may preferably comprise a cordless inner module, outer sheath, DPA, cordless foot pedal, charging base, handpiece cradle, and a power supply as shown in the FIG. 19. The inner module may further comprise a motor, gear box assembly, a printed circuit board (PCB) with a wireless communication protocol and a rechargeable battery. The foot pedal may also be composed of a PCB with a wireless communication protocol and a rechargeable battery. A DPA for the cordless prophy handpiece may be designed as part of the closed system to spin smoothly. The speed of the DPA cup is controlled by the motor control as disclosed in the invention, where a preset polishing speed is reached when the DPA touches the tooth, thus reducing or eliminating the need for constant use of the foot pedal. It should be noted that the polishing speed may increase in steps, up to a preset maximum speed, as the torsional load increases. Accordingly, the polishing speed may decrease in steps, down to an idle speed, as the torsional load decreases. FIG. 20 shows an example speed-torque relationship of an embodiment of the invention. At the completion of a procedure, the DPA is disposed of. The inner module is preferably rechargeable and houses the motor control circuitry.

In a preferred embodiment, the prophy handpiece may have a button and an indicator to trigger and indicate the current state of the motor control. Where a foot pedal accompanies the motor control feature in a handpiece, standard synchronizing means may be used to synchronize the use of the motor control and the pedal wherein the pedal may, for example, override the motor control when pressed and the motor control may override the pedal when activated by the button. The motor control feature may work in conjunction with a cordless foot pedal through a secured RF protocol.

In another preferred embodiment, the motor control feature allows the operator to control the motor speed to allow the application of a paste to the DPA with a preset slow rotational speed, a torque dependent motor speed, or no rotation. In a further preferred embodiment the torque-response mode operation allows the motor to accelerate or decelerate in a controlled rate to reach one of a plurality of preset polishing speeds when the DPA touches or is removed from the tooth, with the preset speed depending on the torsional load exerted on the motor, a time delay and a hysteresis current threshold.

In another preferred embodiment, the inner module may enter a low current mode after, for example, 60 seconds of non-operation and automatically shut down to conserve energy. The handpiece may also "wake up" from a low current mode when the handpiece is picked up through the use of conventional accelerometer means which sense accelerative forces and translate the forces to changes in velocity and/or orientation. Other modes such as a "sleep" mode may be incorporated after long periods of non-operation, for example, 1 hour. Furthermore, the inner module may have a shutdown switch that may preferably override the different modes in the handpiece.

In a further preferred embodiment, a start time delay is observed after which the systems activates the motor and sets a no load idle current. This calibration may be needed to give a frame of reference with which to compare increasing and decreasing currents.

Figure 17:
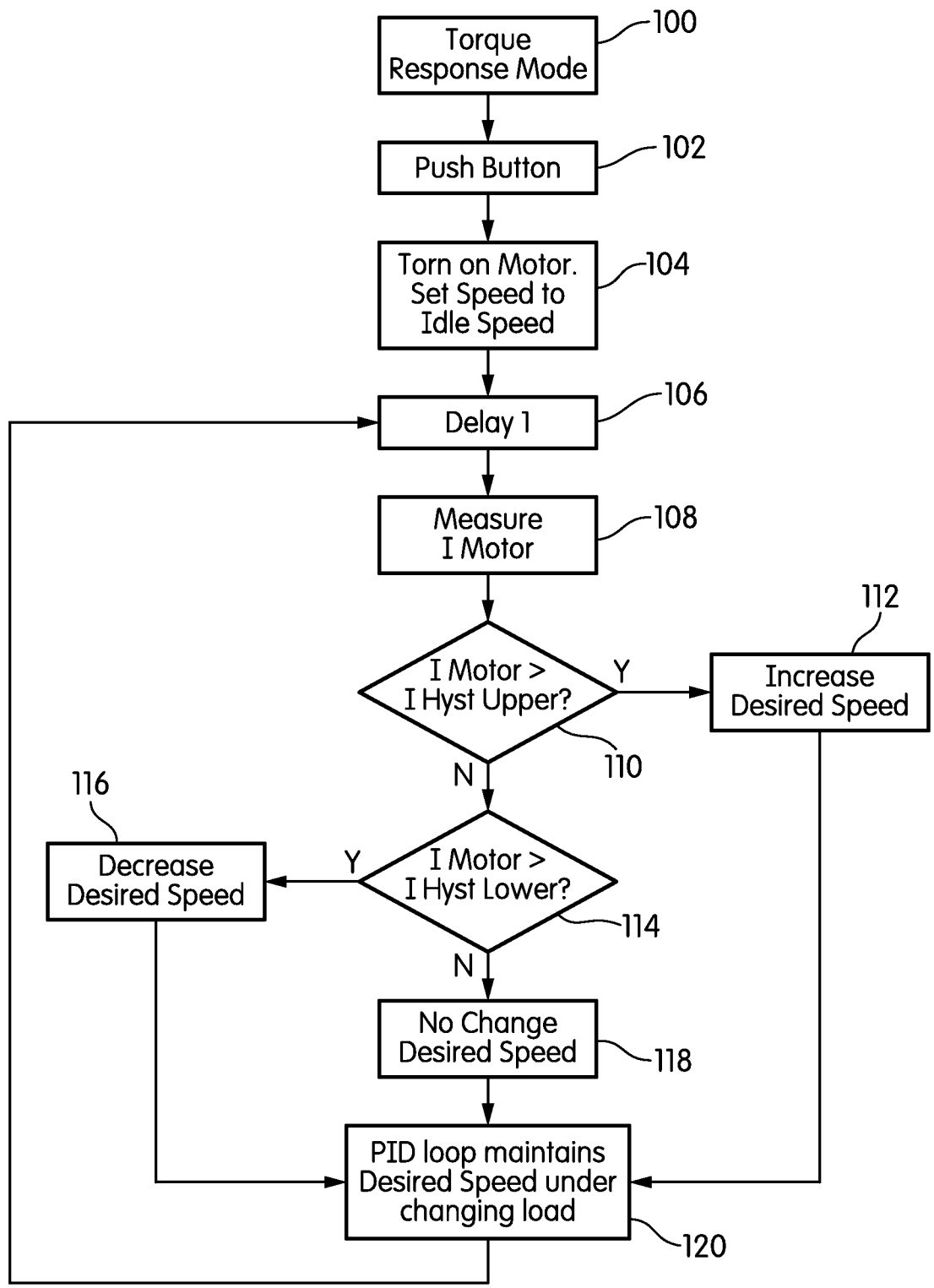
FIG. 17 is a flowchart illustrating the overall operation of the motor control.

FIG. 17 illustrates an overall implementation incorporating the concepts described herein. When the motor control (referred to as "torque-response mode") button is pressed 102, the motor is turned on with an initial speed equal to an idle speed 104. The idle speed is preferably a preset value and the no load motor current corresponding to the idle speed is obtained as part of a startup calibration of the handpiece. This allows zeroing out the motor current generated by the drive system friction (i.e. friction generated by the motor itself, gearbox, outer sheath and DPA). A preset time delay 106 is observed before the motor current, I motor, is measured. A predetermined hysteresis constant is used in the determination and update of an upper hysteresis limit current (I_Hyst_Upper) and a lower hysteresis limit current (I_Hyst_lower). For example, if the hysteresis constant is 10 mA and motor current, I motor, is 50 mA, I Hyst Upper is 60 mA, and I_Hyst_lower is 40 mA. If I motor changes to 70 mA, then I_Hyst_Upper is 80 mA and I_Hyst_lower is 60 mA. As shown in 108-120, if the measured motor current is greater than I_Hyst_Upper, as witnessed, for example, when the DPA cup makes contact with a tooth, the speed of the motor is increased as desired. The speed correlates with the amount of torque exerted on the motor by the application of the DPA to a surface (i.e. tooth) as shown in FIG. 25. The application force of the DPA generates a thrust friction between the DPA cup or brush and the surface intended to be polished. This thrust friction is translated into a torsional load on a short gear of the DPA, which then transfers this torsional load into a long gear, then onto a drive dog in the outer sheath, which is mechanically coupled to the gearbox that then transfers the torsional load directly to the motors drive shaft. This torsional load opposes the motors ability to rotate freely dampening its speed. The new speed is maintained by the PID control loop. Alternatively, if the measured motor current is less than I_Hyst_lower, as witnessed for example when the DPA cup is removed from contact with a tooth, the speed of the motor is decreased as desired. The new speed is thus maintained by the PID.

Figure 18:
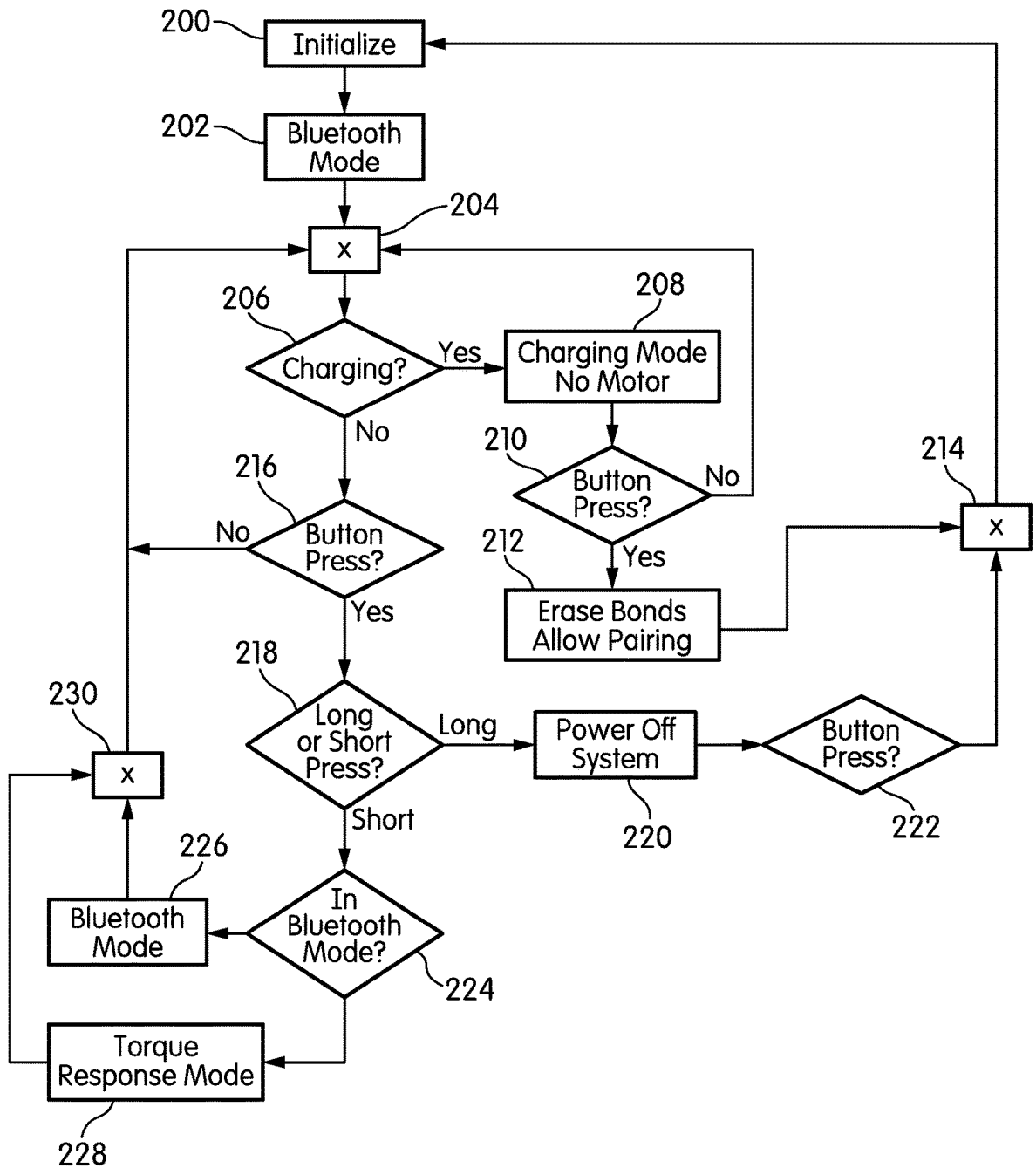
FIG. 18 illustrates an embodiment of the present invention wherein the motor control apparatus of the invention operates in turn with a foot pedal and wherein the foot pedal operates only in Bluetooth mode.

FIG. 18 illustrates an embodiment of the present invention wherein the motor control apparatus operates in turn with a foot pedal and wherein the foot pedal operates only in Bluetooth mode. After turning on the handpiece 200, the system is put in Bluetooth mode 202. The system checks if the handpiece is charging 206 and deactivates the motor accordingly 208. When the handpiece is not being charged, a short button press 216 causes system to verify if Bluetooth mode is still on 224. If not, torque-response mode button has been pressed and this torque-response mode 228 is made available to the user. Torque-response mode refers herein to a mode employing the motor control feature of the invention. Preferably, the foot pedal operates only when blue tooth mode is active. Furthermore, a long button press may signify a power system shut down request 220.

FIG. 19 is a perspective view of a prophy handpiece employing the motor control technology of the present invention. An outer sheath 306 detachably engages with a cordless inner module 302 of the handpiece. The inner module houses the circuitry of the rotary handpiece. A mode indicator 312 may show the current mode of operation of the handpiece. An on/off/mode button 308 may be used to power on the handpiece or toggle between modes. A charging base 310 and charge indicator 314 may show the amount of charge accumulated. A cradle 316 for the handpiece as well as a wireless foot pedal 318 may be used with the handpiece. When the dental practitioner powers on the handpiece, it is first calibrated to attain a baseline motor current and a corresponding motor idle speed. Any pressure applied to the prophy cup is transmitted through a drive dog to the handpiece motor to increase the speed above the idle speed. The rotational speed of the DPA cup is manageably controlled by the dental practitioner by exerting increasing pressure over a time period, for example 1 second, between the DPA cup and tooth to increase the speed of rotation of the cup and releasing pressure, over a time period, for example 1 second, between the DPA cup and tooth to decrease said speed. A foot pedal may override the motor control mode through a mode switch button or by simply pressing on the foot pedal. After a predetermined time of no use, the handpiece can automatically shut down or go into rest mode. In an embodiment, a maximum motor speed above which speed cannot increase may be observed. In this case, further torsional load on the motor may preferably cause the motor speed to gradually decrease to zero or to the idle speed.

FIG. 20 shows a chart illustrating a speed-torque performance for the embodiments of the invention. The system maintains selected cup speeds within, for example, the range of 300 RPM to 3200 RPM as torques vary between 0.5 to 1.3 ozf-in. Performance may not be required at speeds below, for example 300 RPM. It should be clearly understood that figures shown are set forth by way of illustration only and are not meant as limitations. Accordingly, different performance characteristics may be incorporated in an actual device.

Figure 21:
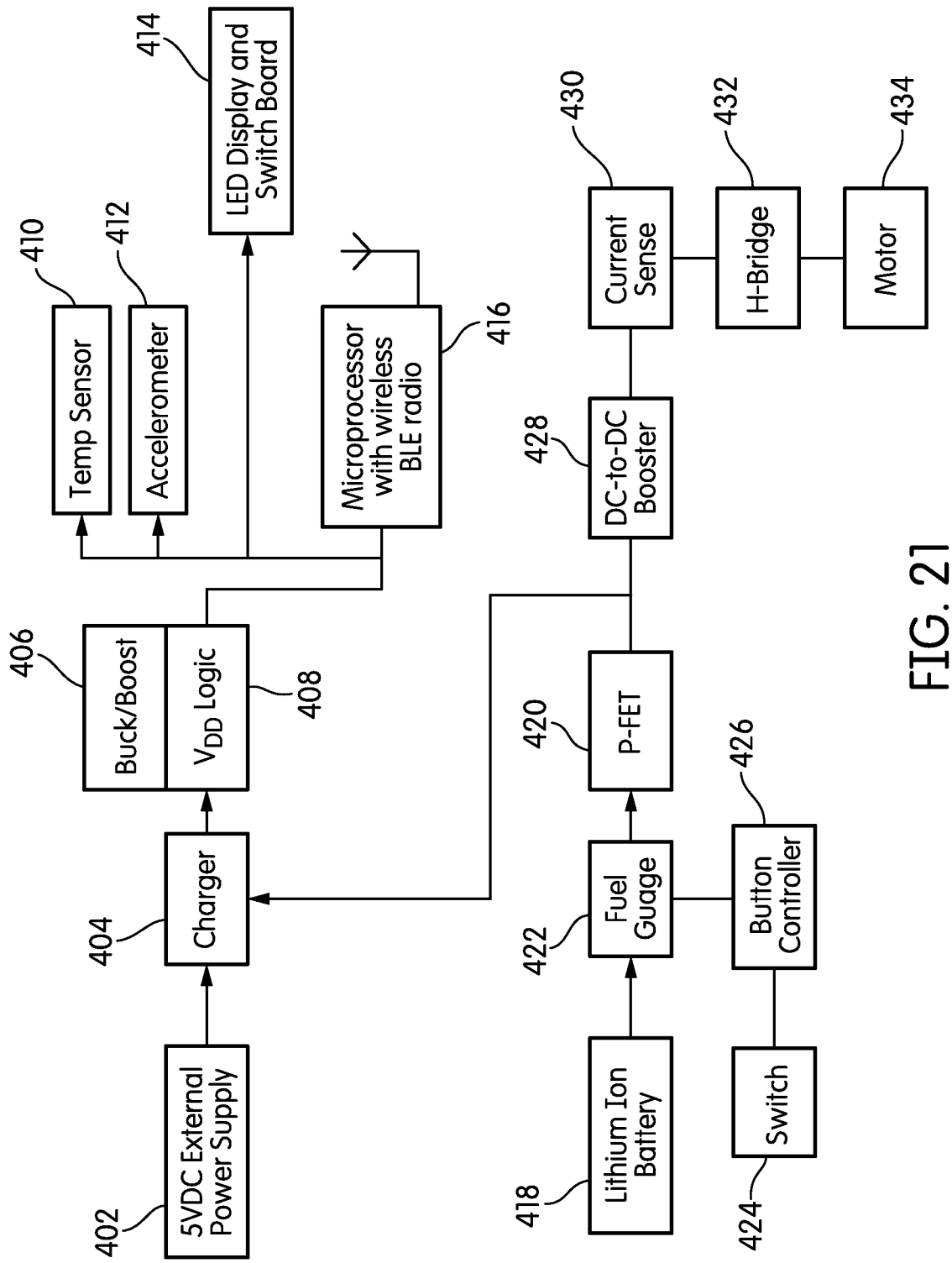
FIG. 21 is a high level block diagram showing an example configuration of a handpiece employing the motor control technology of the invention.

FIG. 21 is a high level block diagram showing an example configuration of a motor control apparatus. According to this embodiment, the apparatus, a wireless prophy handpiece, is powered from a battery 418 which is charged via an external 5V DC power supply and an internal charging circuit. The battery is protected from discharge during via a button controller 426 and P-FET 420 which are used to disconnect the battery from the circuitry of the main controller board.

The Lithium Ion battery cell provides a wide range of DC voltages depending on its state of charge. To provide regulated DC power a voltage regulator is used. To drive the motor at the desired RPM a DC-to-DC booster 428 is used. This boosted DC voltage drives the motor 434 through an H-Bridge 432 and current sense chip 430. The H-bridge 432 uses PWM signals from the microprocessor 416 to regulate speed based on foot pedal position or torque-response mode state. The current sense chip 430 provides a signal back to the microprocessor 416 that provides a measurement of the current being delivered to the motor.

The microprocessor may be equipped with a wireless radio; an example wireless communication protocol can be blue tooth low-energy (BLE). The BLE radio provides wireless communication between the handpiece and the foot pedal.

In a preferred embodiment, the main controller board may be equipped with sensors such as a temperature sensor 410 and accelerometer 412, the output of which may provide signals to control the motor 434. The temperature sensor may monitor, for example, the internal ambient temperature of the inner module. The accelerometer may be used by the microprocessor 416 to determine the state of the handpiece. For example, the device may enter a sleep mode if it is inactive for 60 seconds, wherein the motor speed is reduced to zero. The accelerometer may also be used to wake the device up from sleep mode.

The microprocessor 416 may communicate with the Fuel gauge 422, temp sensor 410, and accelerometer 412, charger 404 and H Bridge 432. An A to D converter to take measurements of the motor current from the current sense 430 and the motor's back-emf.

The motor speed is controlled via a PID loop. Motor voltage may be, for example, be determined by brief periods that permit the motor to idle so that a Back-EMF voltage generated by the motor's speed can be monitored. The Back-EMF voltage provides motor speed information to the microprocessor.

Motor current is interpreted by the microprocessor as torque loading of the drive mechanism. Motor current is used during torque-response mode to determine when to alter the motor speed. The sensed motor current may also be used to shut down the unit if the user applies a high torque for too long a period of time.

It will be appreciated therefore, from one of ordinary skill in the art, that the present invention may be embodied, then, in an electrically-operated handpiece, even an ultrasonic scaler, even when the only control available is on-off. It can also be embodied in an air motor, such as a high-speed dental handpiece, when motor speed can be monitored and the air driving the motor controlled. In further embodiments, there may be a plurality hysteresis threshold and time delay values which may be predetermined or not predetermined and varied as desired to achieve appropriate motor speed control.

What has been described and illustrated herein is a preferred embodiment of the invention along with some of its variations. The terms, descriptions and figures used herein are set forth by way of illustration only and are not meant as limitations. Those skilled in the art will recognize that many variations are possible within the spirit and scope of the invention in which all terms are meant in their broadest, reasonable sense unless otherwise indicated. Any headings utilized within the description are for convenience only and have no legal or limiting effect.

The invention claimed is:

1. A method of controlling a motor driven dental handpiece having a motor control for driving a motor for dental treatment comprising:
 applying a tool of the handpiece to a tooth to generate a load,
 applying said load to an electric motor of the handpiece,
 increasing or decreasing a speed of the tool of the handpiece to a controlled output goal corresponding to said load,
 wherein the increasing or decreasing is according to a motor-control profile of the handpiece,
 wherein during a period of application of the load to the electric motor, the speed is automatically increased for an increasing load and automatically decreased for a decreasing load without a use of a pedal, and
 wherein the load is a torque applied to the electric motor.

2. The method according to claim 1, further comprising, reducing the speed of the motor to an idle speed when the torque is low or no longer applied.

3. The method according to claim 2, wherein the idle speed is 300 rpm and the torque is 0.5 ozf·in or below.

4. A system comprising a processor wherein the processor is configured to perform the method of claim 1.

5. The method according to claim 1, wherein prior to applying tool of the handpiece to the tooth to generate the load, the electric motor is turned on with an initial speed equal to an idle speed, the idle speed being a preset value,
wherein a no-load motor current corresponding to the idle speed is obtained as part of a startup calibration of the motor driven dental handpiece that zeroes out the motor current generated by a drive system friction of the motor driven dental handpiece, and
wherein responsive to applying the tool of the handpiece to the tooth to generate to the load, the increasing or decreasing of the speed in response to increasing or decreasing load respectively is performed automatically within a defined speed range.

6. A method of controlling a motor driven dental handpiece having a motor control for driving a motor for dental treatment comprising:
applying a tool of the handpiece to a tooth to generate a load,
applying said load to an electric motor of the handpiece,
increasing or decreasing a speed of the tool of the handpiece to a controlled output goal corresponding to said load,
wherein the increasing or decreasing is also according to a sustenance of a new motor current resulting from a change in a motor current above a predetermined hysteresis current threshold, over a predetermined time period, and
wherein during a period of application of the load to the electric motor, the speed is automatically increased for an increasing load and automatically decreased for a decreasing load without a use of a pedal.

7. The method according to claim 6, wherein the load is a torque applied to the motor.

8. The method according to claim 7, further comprising selecting a new speed based on a new motor current operating point if said change in the motor current is greater than the predetermined hysteresis current threshold.

9. The method according to claim 7, further comprising, reducing the speed of the motor to an idle speed when the torque is low or no longer applied.

10. The method according to claim 7, further comprising, observing a maximum preset speed of the motor beyond which said speed cannot increase.

11. The method according to claim 7, further comprising, overriding the motor control through wireless radio communication.

12. The method according to claim 7, further comprising, controlling the motor speed by a combination of a plurality or predetermined or variable time periods and hysteresis current thresholds.

13. The method according to claim 7, further comprising, maintaining the speed within 300 amp and 3200 rpm as the torque varies between 0.5 ozf-in to 1.3 ozf-in.

14. The method according to claim 7, wherein the increase or decrease can be in as few as two steps, on/off, or in many steps, or in a constant or variable proportional to the torque.

15. The method according to claim 8, further comprising, determining and updating an upper hysteresis limit current and a lower hysteresis limit current based on said predetermined hysteresis current threshold, wherein if the new motor current operating point is greater than the upper hysteresis limit current or lower than the lower hysteresis limit current, a new upper hysteresis limit current and lower hysteresis limit current are set.

16. The method according to claim 6, wherein prior to applying tool of the handpiece to the tooth to generate the load, the electric motor is turned on with an initial speed equal to an idle speed, the idle speed being a preset value,
wherein a no-load motor current corresponding to the idle speed is obtained as part of a startup calibration of the motor driven dental handpiece that zeroes out the motor current generated by a drive system friction of the motor driven dental handpiece, and
wherein responsive to applying the tool of the handpiece to the tooth to generate to load, the increasing or decreasing of the speed in response to increasing or decreasing load respectively is performed automatically within a defined speed range.

* * * * *